(12) United States Patent
Yang et al.

(10) Patent No.: US 12,197,029 B2
(45) Date of Patent: Jan. 14, 2025

(54) LENS ASSEMBLY

(71) Applicant: SAMSUNG ELECTRO-MECHANICS CO., LTD., Suwon-si (KR)

(72) Inventors: So Mi Yang, Suwon-si (KR); Jae Hyuk Huh, Suwon-si (KR); Byung Hyun Kim, Suwon-si (KR); Ji Su Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/535,362

(22) Filed: Dec. 11, 2023

(65) Prior Publication Data

US 2024/0118513 A1 Apr. 11, 2024

Related U.S. Application Data

(63) Continuation of application No. 17/470,375, filed on Sep. 9, 2021, now Pat. No. 11,874,519.

(30) Foreign Application Priority Data

Apr. 5, 2021 (KR) .................. 10-2021-0044155

(51) Int. Cl.
*G02B 7/02* (2021.01)
*G02B 3/04* (2006.01)
*G02B 3/00* (2006.01)

(52) U.S. Cl.
CPC ................. *G02B 7/02* (2013.01); *G02B 3/04* (2013.01); *G02B 2003/0093* (2013.01)

(58) Field of Classification Search
CPC . G02B 7/02; G02B 7/021; G02B 3/04; G02B 3/00; G02B 2003/0093
USPC .......................................... 359/819
See application file for complete search history.

(56) References Cited

U.S. PATENT DOCUMENTS

| | | | |
|---|---|---|---|
| 7,419,315 B2* | 9/2008 | Hirata | G02B 7/021 396/529 |
| 8,817,399 B2 | 8/2014 | Suigetsu et al. | |
| 9,939,654 B2 | 4/2018 | Nomura et al. | |
| 10,473,880 B2 | 11/2019 | Yang et al. | |
| 10,598,890 B2 | 3/2020 | Kim et al. | |
| 11,333,845 B2* | 5/2022 | Yedid | G02B 7/021 |

(Continued)

FOREIGN PATENT DOCUMENTS

| | | |
|---|---|---|
| CN | 103250082 A | 8/2013 |
| CN | 105549296 A | 5/2016 |

(Continued)

OTHER PUBLICATIONS

Chinese Office Action issued on Feb. 1, 2024, in counterpart Chinese Patent Application No. 202111418161.9 (4 pages in English, 8 pages in Chinese).

(Continued)

*Primary Examiner* — William R Alexander
(74) *Attorney, Agent, or Firm* — NSIP Law

(57) ABSTRACT

A lens assembly includes a first D-cut lens and a lens barrel surrounding a portion of a side surface of the first D-cut lens. The side surface of the first D-cut lens includes a linear portion, and the lens barrel is configured to expose at least a portion of the linear portion of the first D-cut lens in a direction perpendicular to an optical axis.

20 Claims, 5 Drawing Sheets

(56) References Cited

U.S. PATENT DOCUMENTS

| | | | |
|---|---|---|---|
| 11,714,267 B2* | 8/2023 | Chen | G02B 3/04 |
| | | | 359/819 |
| 2009/0041451 A1 | 2/2009 | Miyamoto | |
| 2010/0073782 A1* | 3/2010 | Kim | G02B 7/02 |
| | | | 359/819 |
| 2013/0279032 A1* | 10/2013 | Suigetsu | G02B 7/026 |
| | | | 359/827 |
| 2015/0160438 A1 | 6/2015 | Okuda | |
| 2015/0215542 A1 | 7/2015 | Nomura et al. | |
| 2016/0116758 A1 | 4/2016 | Nomura et al. | |
| 2018/0372984 A1 | 12/2018 | Shirotori | |
| 2019/0174032 A1 | 6/2019 | Yang et al. | |
| 2019/0179098 A1 | 6/2019 | Yang et al. | |
| 2019/0179103 A1 | 6/2019 | Yang et al. | |
| 2019/0346650 A1 | 11/2019 | Yang et al. | |
| 2020/0004007 A1 | 1/2020 | Li et al. | |
| 2020/0057179 A1 | 2/2020 | Yang et al. | |
| 2021/0055508 A1 | 2/2021 | Chen et al. | |
| 2021/0063688 A1 | 3/2021 | Shin et al. | |
| 2021/0072488 A1 | 3/2021 | Yang et al. | |
| 2021/0121050 A1 | 4/2021 | Zhao | |
| 2021/0191002 A1 | 6/2021 | Choi et al. | |
| 2021/0199934 A1* | 7/2021 | Chen | G02B 3/04 |
| 2022/0317409 A1 | 10/2022 | Yang et al. | |
| 2022/0317410 A1 | 10/2022 | Yang et al. | |
| 2023/0194823 A1* | 6/2023 | Hur | B29C 45/0046 |
| | | | 359/819 |

FOREIGN PATENT DOCUMENTS

| | | |
|---|---|---|
| CN | 108627942 A | 10/2018 |
| CN | 109143523 A | 1/2019 |
| CN | 109917528 A | 6/2019 |
| CN | 109981942 A | 7/2019 |
| CN | 210381040 U | 4/2020 |
| CN | 112444952 A | 3/2021 |
| CN | 216901099 U | 7/2022 |
| JP | 2011-145522 A | 7/2011 |
| KR | 10-2019-0066522 A | 6/2019 |
| KR | 10-2019-0129463 A | 11/2019 |
| KR | 10-2020-0019547 A | 2/2020 |
| TW | 202109112 A | 3/2021 |

OTHER PUBLICATIONS

Indian Office Action issued on Oct. 19, 2022, in counterpart Indian Patent Application No. 202114042307 (5 Pages in English).

Taiwanese Office Action Issued on Jan. 12, 2023, in counterpart Taiwanese Patent Application No. 110134834 (5 Pages in English, 6 Pages in Chinese).

Korean Office Action issued on Jun. 14, 2023, in counterpart Korean Patent Application No. 10-2021-0044155 (8 pages in English, 6 pages in Korean).

* cited by examiner

LENS ASSEMBLY

CROSS-REFERENCE TO RELATED APPLICATIONS

This application is a continuation of application Ser. No. 17/470,375 filed on Sep. 9, 2021, which claims the benefit under 35 U.S.C. § 119(a) of Korean Patent Application No. 10-2021-0044155 filed on Apr. 5, 2021 in the Korean Intellectual Property Office, the entire disclosure of which is incorporated herein by reference for all purposes.

BACKGROUND

1. Field

The following description relates to a lens assembly, and more particularly, to a structure of a lens and a barrel accommodating the lens, which may increase optical performance of a lens assembly.

2. Description of Related Art

Cameras may employ a D-cut lens to provide a high magnification image. A D-cut lens is a lens having a shape in which a portion of a circular lens is cut in a straight line. In the case of such a D-cut lens, an area of a portion exhibiting optical performance is smaller than that of a circular lens, and the optical performance (e.g., resolution, F/no, etc.) may be relatively low. In addition, since the D-cut lens has an asymmetric shape, as compared to the circular lens, the D-cut lens is difficult to manufacture.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes: a first D-cut lens; and a lens barrel surrounding a portion of a side surface of the first D-cut lens. The side surface of the first D-cut lens includes a linear portion, and the lens barrel is configured to expose at least a portion of the linear portion of the first D-cut lens in a direction perpendicular to an optical axis.

The lens barrel may include an opening corresponding to the linear portion, and the linear portion may be exposed through the opening.

The linear portion may extend in a first direction perpendicular to the optical axis, and the opening may be configured to expose the linear portion in a second direction perpendicular to the optical axis and the first direction.

The first D-cut lens may extend to an inside of the opening.

The linear portion may be positioned inside the opening.

The lens barrel may have a first length in a direction parallel to the optical axis, and the opening may have a second length in a direction parallel to the optical axis. A ratio of the second length to the first length may be greater than or equal to 0.1 and less than or equal to 0.5.

In a view of the D-cut lens in a direction perpendicular to the optical axis, the linear portion may include a first section extending toward an image-side surface and a second section extending from an end of the first section toward the image-side surface, the first section may be exposed in a direction perpendicular to the optical axis through the opening, and the second section may be covered by the lens barrel.

The first section may include a first inclined surface, the second section may include a second inclined surface, and the first inclined surface may converge toward the optical axis more steeply than the second inclined surface.

The first inclined surface may have a first angle with respect to the optical axis, and the second inclined surface may have a second angle with respect to the optical axis that is smaller than the first angle.

The opening may be open in a direction parallel to the optical axis.

The opening may have a hole shape positioned at an inner portion of the lens barrel.

A height from the optical axis to the linear portion may be less than a height from the optical axis to an outer surface of the lens barrel.

The linear portion may include a first linear portion and a second linear portion extending parallel to each other. The first linear portion and the second linear portion may be spaced apart from each other in a thickness direction of the lens barrel, and a distance between the first linear portion and the second linear portion may be less than a thickness of the lens barrel.

The lens assembly may further include a second D-cut lens disposed adjacent to the first D-cut lens. The second D-cut lens may include another linear portion formed in a side surface of the second D-cut lens. The lens barrel may be configured to expose at least a portion of the other linear portion in the direction perpendicular to the optical axis.

A ratio of a shorter axis length of the first D-cut lens to a longer axis length of the first D-cut lens may be greater than or equal to 0.5 and less than or equal to 0.8.

The lens barrel may include a rim defining an opening in a side surface of the lens barrel, and the linear portion may be positioned in a space surrounded by the rim.

An entirety of the linear portion may be positioned in a space surrounded by the rim.

In another general aspect, a lens assembly includes: a lens including a side surface, the side surface having an arc portion and a linear portion extending transversely to the arc portion; and a lens barrel surrounding a portion of a side surface of the lens. An opening is formed in a side wall of the lens barrel, and is configured to expose at least a portion of the linear portion in a direction perpendicular to an optical axis.

The linear portion may be disposed at a position between an inner surface of the side wall and an outer surface of the side wall.

The opening may be formed in an end portion of the lens barrel.

Other features and aspects will be apparent from the following detailed description, the drawings, and the claims.

Figure 1:
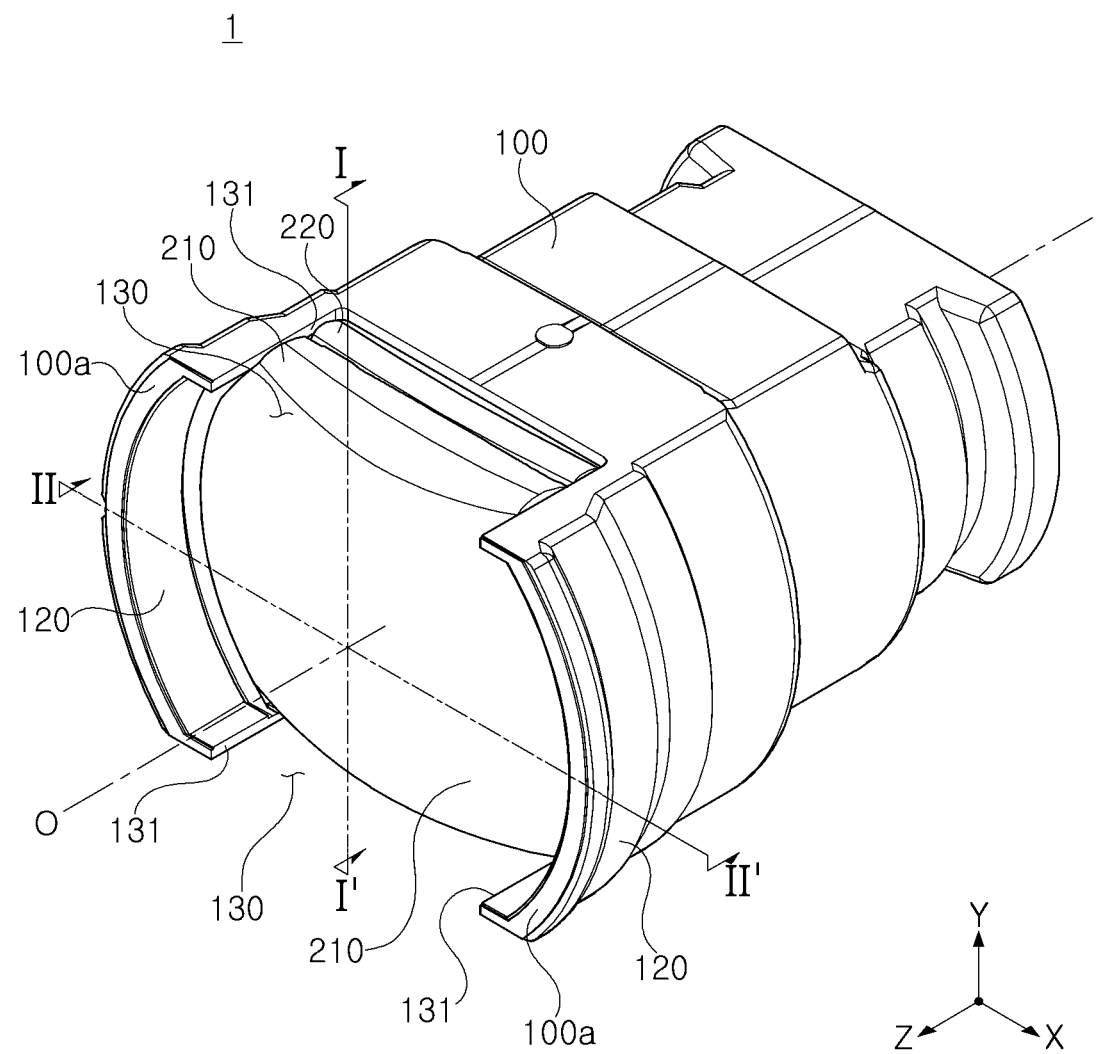
FIG. 1 is a perspective view of a lens assembly, according to an embodiment.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

Figure 2:
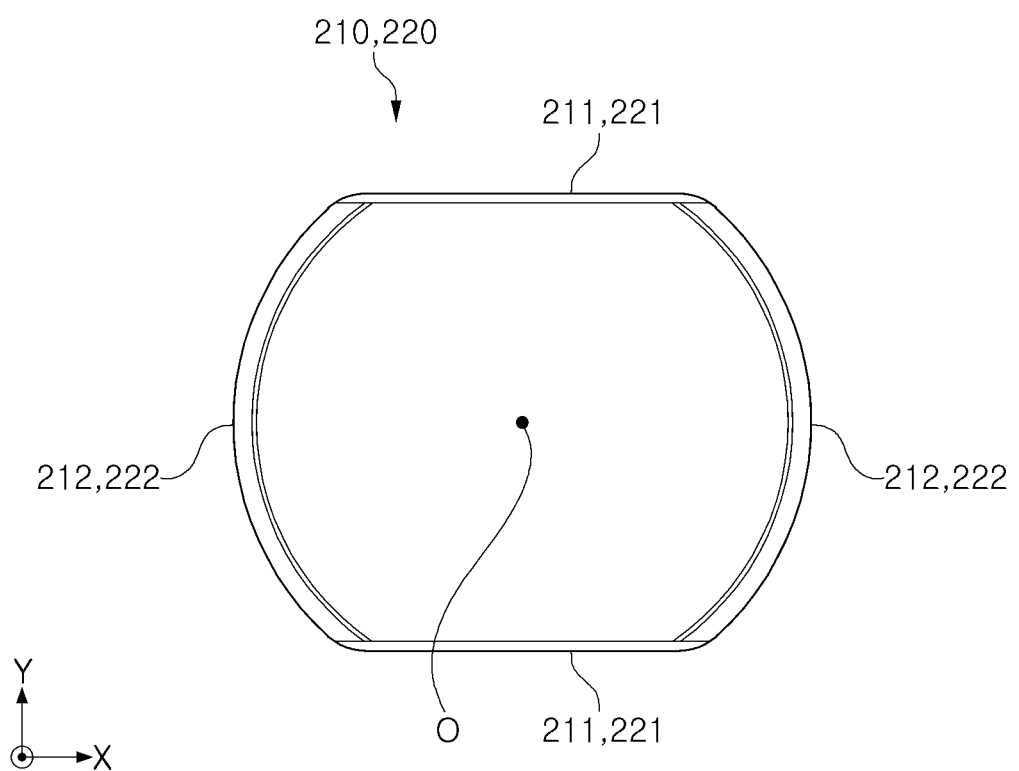
FIG. 2 is a view of a D-cut lens taken in a direction parallel to an optical axis, according to an embodiment.
Figure 3:
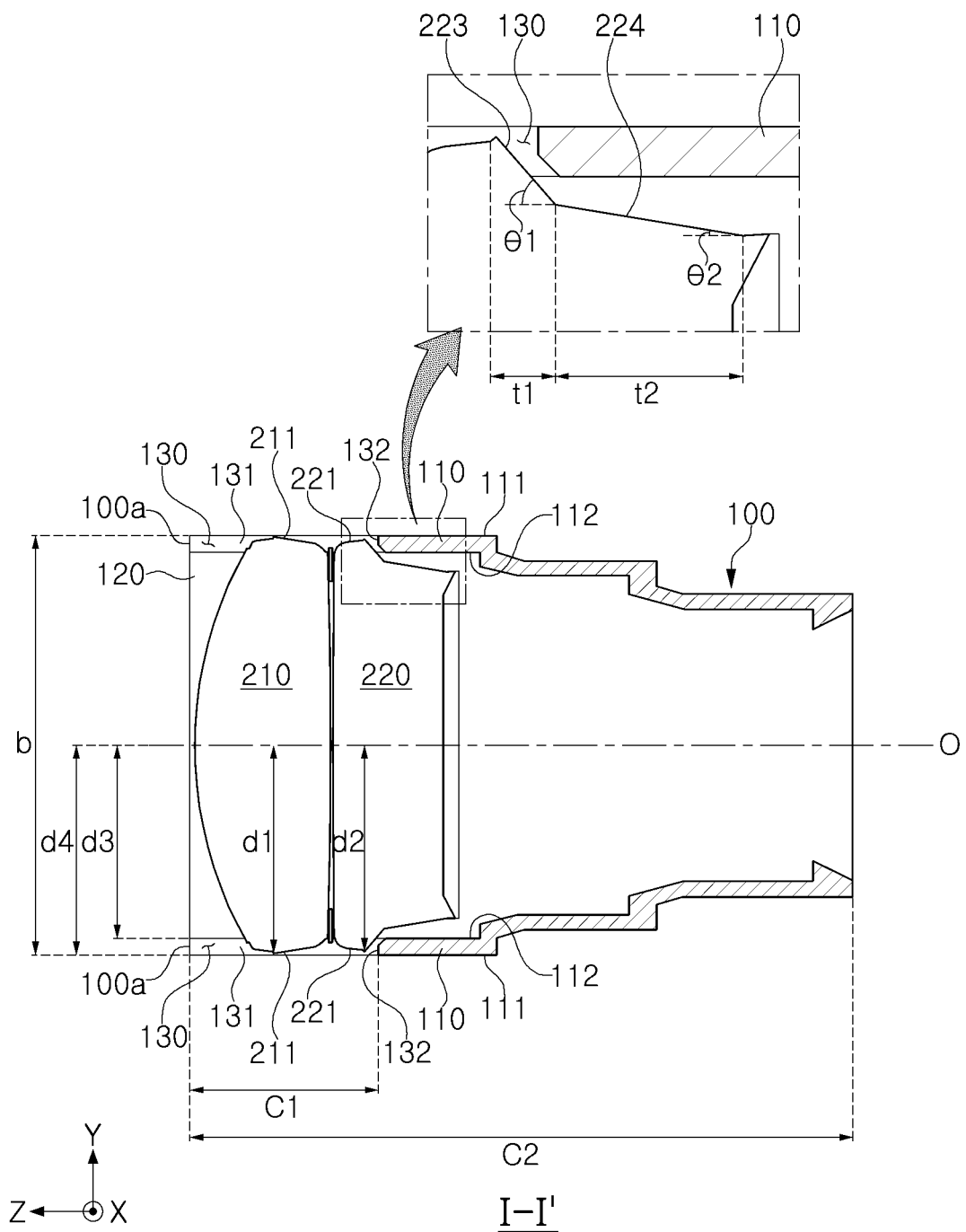
FIG. 3 is a cross-sectional view taken along line I-I' of FIG. 1.
Figure 4:
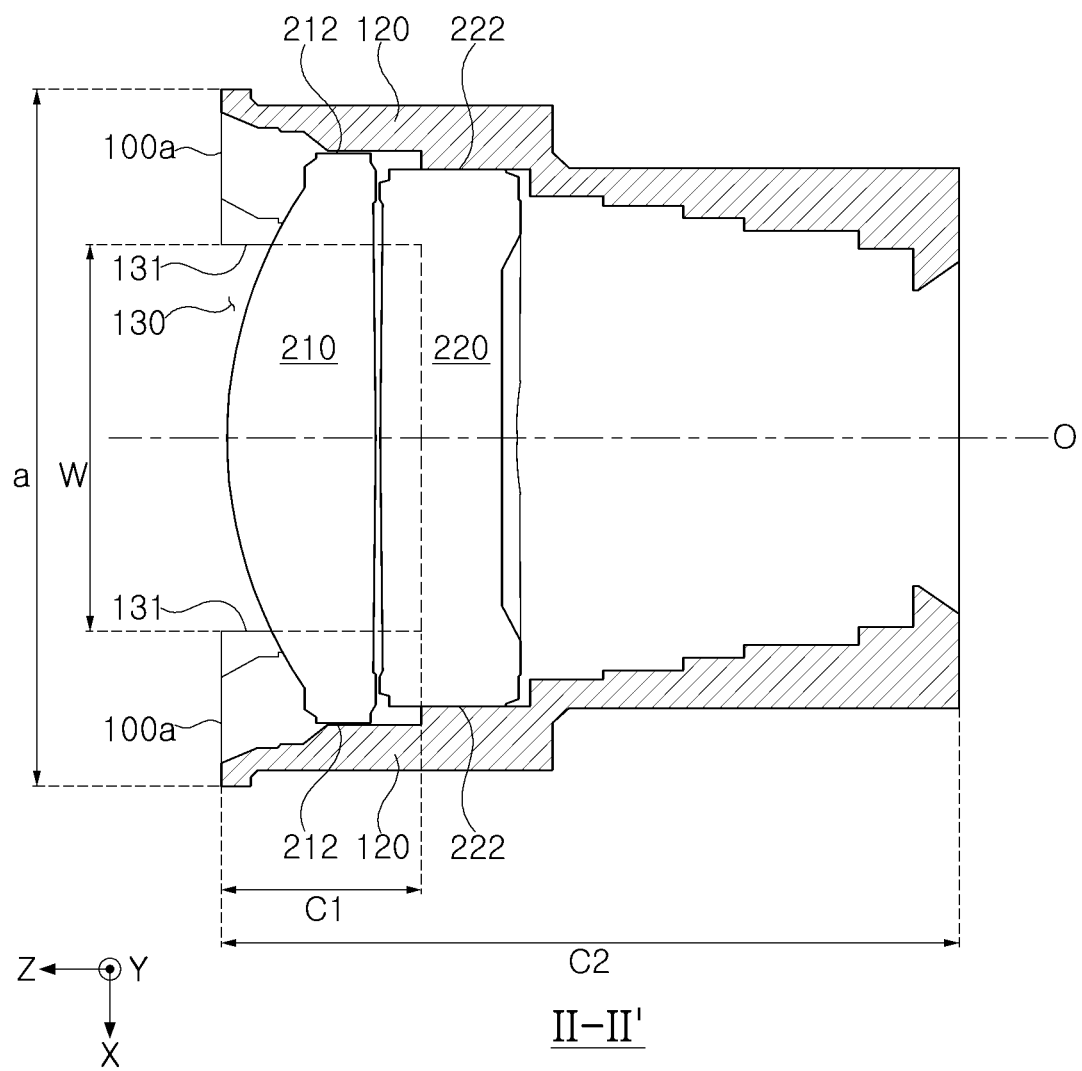
FIG. 4 is a cross-sectional view taken along line II-II' of FIG. 1.

FIG. 1 is a perspective view of a lens assembly 1, according to an embodiment. FIG. 2 is a view of D-cut lenses in a direction parallel to an optical axis. FIG. 3 is a cross-sectional view taken along line I-I' of FIG. 1. FIG. 4 is a cross-sectional view taken along line II-II' of FIG. 1.

Referring to FIG. 1, in an example, the lens assembly 1 includes a lens barrel 100 and D-cut lenses 210 and 220 accommodated in the lens barrel 100. The lens assembly 1 may include two or more D-cut lenses 210 and 220. For example, the lens assembly 1 may include a first D-cut lens 210 and a second D-cut lens 220.

Referring to FIGS. 3 and 4, it is illustrated that only the first D-cut lens 210 and the second D-cut lens 220 are accommodated in the lens barrel 100, but this is for convenience of description, and another lens may be disposed inside the lens barrel 100. For example, an additional D-cut lens or a circular lens may be positioned in the lens barrel 100.

Referring to FIG. 2, side surfaces of the D-cut lenses 210 and 220 may include linear portions 211 and 221 and arc portions 212 and 222. The linear portions 211 and 221 may be portions extending from the side in a direction perpendicular to an optical axis O (e.g., the X direction). The arc portions 212 and 222 may be portions extending in a circumferential direction with respect to the optical axis O from the side.

The linear portions 211 and 221 may include two linear portions extending parallel to each other. For example, referring to FIG. 2, the two linear portions may be spaced apart in a Y direction and may extend parallel to each other in the X direction. The arc portions 212 and 222 may include two arc portions facing each other. Referring to FIG. 2, the arc portions 212 and 222 include a left arc portion and a right arc portion, respectively, with respect to the optical axis O.

The shape of the D-cut lenses 210 and 220 may be defined by a shorter axis length and a longer axis length. Referring to FIG. 2, a direction (i.e., the Y axis) in which the two linear portions face each other is the shorter axis, and a direction (i.e., the X axis) in which the two arc portions face each other is the longer axis. For example, the shorter axis length may be a width of the D-cut lenses 210 and 220 in the Y direction, and the longer axis length may be a width of the D-cut lenses 210 and 220 in the X direction. The shorter axis length may correspond to a distance between the linear portions of the D-cut lenses 210 and 220. In an embodiment, a ratio of the shorter axis length to the longer axis length of the D-cut lenses 210 and 220 may be in the range of greater than or equal to 0.5 and less than or equal to 0.8.

In the disclosure herein, the D-cut lenses 210 and 220 include an object-side surface and an image-side surface. The object-side surface is a surface relatively close to an object, and the image-side surface is a surface relatively close to an imaging plane. Light incident on the D-cut lenses 210 and 220 is refracted while sequentially passing through the object-side surface and the image-side surface.

Referring to FIG. 1, the lens barrel 100 is configured to surround at least a portion of the D-cut lenses 210 and 220. In an embodiment, the lens barrel 100 may include a flat plate portion 110 and a cylindrical portion 120. The flat plate portion 110 is disposed on two sides of the D-cut lenses 210 and 220. For example, the flat plate portion 110 may include two flat plates spaced apart from each other in a +Y direction and a −Y direction of the D-cut lenses 210 and 220 and facing each other, and extending in XZ planes. The cylindrical portion 120 has a shape surrounding the arc portions 212 and 222 of the D-cut lenses 210 and 220 in a circumferential direction. The arc portions 212 and 222 are surrounded by the lens barrel 100 and are not exposed externally of the lens barrel 100.

Referring to FIGS. 1 and 3, the linear portions 211 and 221 of the D-cut lenses 210 and 220 may be exposed outside the lens barrel 100. When the lens barrel 100 is viewed in a direction (e.g., in the Y direction) perpendicular to the optical axis O, a portion or the entirety of the linear portions 211 and 221 of the D-cut lenses 210 and 220 may be visible as the outside of the lens barrel 100. For example, in the first D-cut lens 210, the entire linear portions 211 and 221 are exposed in the Y direction, and in the second D-cut lens 220, a partial sections of the linear portions 211 and 221 are exposed in the Y direction.

In an embodiment, the lens barrel 100 is configured such that the linear portions 211 and 221 of the D-cut lenses 210 and 220 are exposed externally. For example, the flat plate portion 110 of the lens barrel 100 may include an opening 130 corresponding to the linear portions 211 and 221 of the D-cut lenses 210 and 220, and the linear portions 211 and 221 may be exposed externally of the lens barrel 100 through the opening 130. The opening 130 may be configured as a rectangular window.

In an embodiment, the opening 130 may have a window shape that is open in a direction (e.g., +Z direction) parallel to the optical axis O. When the linear portions 211 and 221 extend in a first direction (e.g., the X direction) perpendicular to the optical axis O, the linear portions 211 and 221 may be exposed in a direction (e.g., the Y direction) perpendicular to both the optical axis O and the first direction.

Referring to FIGS. 1 and 4, in an embodiment, the opening 130 may be configured to have a width W corresponding to the linear portions 211 and 221 of the D-cut lenses 210 and 220. The width W of the opening 130 corresponds to a length of the linear portions 211 and 221 of the D-cut lenses 210 and 220 in the X direction.

In an embodiment, the D-cut lenses 210 and 220 may extend to the opening 130. That is, the linear portions 211 and 221 of the D-cut lenses 210 and 220 may be positioned inside the opening 130. For example, the lens barrel 100 may include a rim 131 defining the opening 130, and the D-cut lenses 210 and 220 may extend to a space surrounded by the rim 131. That is, a portion or the entirety of the linear portions 211 and 221 may be positioned in a space surrounded by the rim 131.

For example, referring to FIG. 3, a distance d1 between the linear portions 211 and 221 of the first D-cut lens 210 and the optical axis O may be greater than a distance d3 between the optical axis O and an internal surface 112 of the flat plate portion 110. A distance d2 between the linear portions 211 and 221 of the second D-cut lens 220 and the optical axis O may be greater than the distance d3 between the optical axis O and the internal surface 112 of the flat plate portion 110.

While a lens barrel of the related art is configured such that all sides of the D-cut lenses 210 and 220 are covered, the lens barrel 100 in an embodiment disclosed herein is configured such that at least a portion of the linear portions 211 and 221 of the D-cut lenses 210 and 220 is exposed.

Without the opening 130 in the flat plate portion 110 of the lens barrel 100, a shortened length of the D-cut lenses 210 and 220 is limited by an interval between flat plates disposed on both sides of the D-cut lenses 210 and 220. In contrast, according to an embodiment, with the opening 130 on the flat plate portion 110, the D-cut lenses 210 and 220 may be manufactured such that a shorter axis length (i.e., 2*d2) is greater than an interval (i.e., 2*d3) of the flat plate portion 110.

According to an embodiment, a length of the D-cut lenses 210 and 220 in the shorter axis direction may be longer than that of the related art, and the effective surface exhibiting optical performance in the D-cut lenses 210 and 220 may be increased. This may contribute to improving the optical performance of the D-cut lenses 210 and 220 or the lens assembly 1 employing the D-cut lenses 210 and 220.

From the perspective of the thickness of the lens barrel 100, the effective surface of the D-cut lenses 210 and 220 may be increased without increasing the thickness of the lens barrel 100. This may contribute to thinning of the lens assembly 1 or a device employing the lens assembly 1.

In addition, since a difference between the shorter axis length and the longer axis length is reduced, the manufacturing of the D-cut lenses 210 and 220 is relatively easy. That is, the D-cut lenses 210 and 220 accommodated in the lens barrel 100 may be manufactured to be relatively closer to a design specification.

In an embodiment, a thickness of the D-cut lenses 210 and 220 in the shorter axis direction may be smaller than a thickness (b, or 2*d4) of the lens barrel 100. Accordingly, when the lens barrel 100 is mounted on a plane, the D-cut lenses 210 and 220 may not be in contact with the plane. Referring to FIG. 3, the distances d1 and d2 from the optical axis O to the linear portions 211 and 221 of the first D-cut lens 210 may be smaller than the distance d4 from the optical axis O to the external surface 111 of the lens barrel 100. This contributes to preventing an external impact from being directly applied to the D-cut lenses 210 and 220. However, depending on the shape of an object on which the lens barrel 100 is seated, the linear portions 211 and 221 of the D-cut lenses 210 and 220 may protrude farther in the Y direction than the external surface 111 of the lens barrel 100.

The lens barrel 100 including the opening 130 may have a relatively lower rigidity than a lens barrel without the opening 130. Thus, the opening 130 may be provided to the extent that structural stability of the lens barrel 100 is not impaired.

Referring to FIG. 3 or 4, the opening 130 extends from a front surface of the lens barrel 100 by a first length C1 in a −Z direction, and the lens barrel 100 has a second length (e.g., a total length of the lens barrel 100) C2. In this case, a ratio C1/C2 of the first length C1 to the second length C2 may be greater than or equal to 0.1 and less than or equal to 0.5.

In an embodiment, the lens barrel 100 may be configured to expose only a portion of the linear portions 211 and 221 of the D-cut lenses 210 and 220 externally. Since the opening 130 is configured to expose only a portion of the D-cut lenses 210 and 220, the area of the opening 130 may be reduced, which may minimize a reduction in rigidity of the lens barrel 100.

Referring to FIGS. 1 and 3, in an embodiment, the lens barrel 100 is configured to expose only a portion of the linear portions 211 and 221 of the second D-cut lens 220 externally. Only a portion of the linear portions 211 and 221 of the second D-cut lens 220 is exposed externally of the lens barrel 100.

For example, the linear portions 211 and 221 of the second D-cut lens 220 include a first section t1 and a second section t2 in a thickness direction (i.e., the optical axis (0) direction or Z direction) of the second D-cut lens 220. A portion closer to an object side than the first section t1, in the linear portions 211 and 221, is exposed in the Y direction through the opening 130. The first section t1 of the linear portions 211 and 221 is only partially exposed through the opening 130 in the Y direction. The second section t2 of the linear portions 211 and 221 is covered by the lens barrel 100 and is not exposed externally.

In an embodiment, the first section t1 and the second section t2 of the linear portions 211 and 221 may be formed as inclined surfaces. For example, the first section t1 may have a first inclined surface 223 having a first angle θ1 with respect to the optical axis O. The second section t2 may have a second inclined surface 224 having a second angle θ2 with respect to the optical axis O. The first angle θ1 and the second angle θ2 may be different from each other. In an embodiment, the first inclined surface 223 may converge more steeply toward the optical axis O than the second inclined surface 224. That is, the second angle θ2 may be smaller than the first angle θ1.

In an embodiment, only a portion of the linear portions 211 and 221 of the D-cut lenses 210 and 220 may be exposed externally of the lens barrel 100.

Among the lens accommodated in the lens barrel 100, the first D-cut lens 210 and the second D-cut lens 220 are exposed externally of the lens barrel 100 in FIGS. 1, 3, and 4. However, this configuration is merely an example, and in another embodiment, only the first D-cut lens 210 may be exposed externally of the lens barrel 100. For example, the linear portions 211 and 211 of the second D-cut lens 220 may not be exposed externally of the lens barrel 100.

The linear portions 211 and 221 of the first D-cut lens 210 are entirely exposed externally of the lens barrel 100, but in another embodiment, only a partial section of the linear portions 211 and 221 of the first D-cut lens 210 may be exposed externally of the lens barrel 100. For example, the first D-cut lens 210 may be configured in the same shape as the second D-cut lens 220. For example, the linear portions 211 and 221 of the first D-cut lens 210 may include a first inclined surface and a second inclined surface, the second inclined surface may be covered by the lens barrel 100, and the first inclined surface may be exposed externally of the lens barrel 100.

Referring to FIG. 3, only a partial section of the linear portions 211 and 221 of the second D-cut lens 220 is exposed externally of the lens barrel 100, but this is merely an example, and in another embodiment, the entirety of the linear portions 211 and 221 of the second D-cut lens 220 may be exposed externally of the lens barrel 100.

Referring to FIGS. 3 and 4, a ratio (b/a) of the shorter axis length (b) to the longer axis length (a) of the lens barrel 100 may be in the range of 0.5 or more and 0.8 or less.

Figure 5:
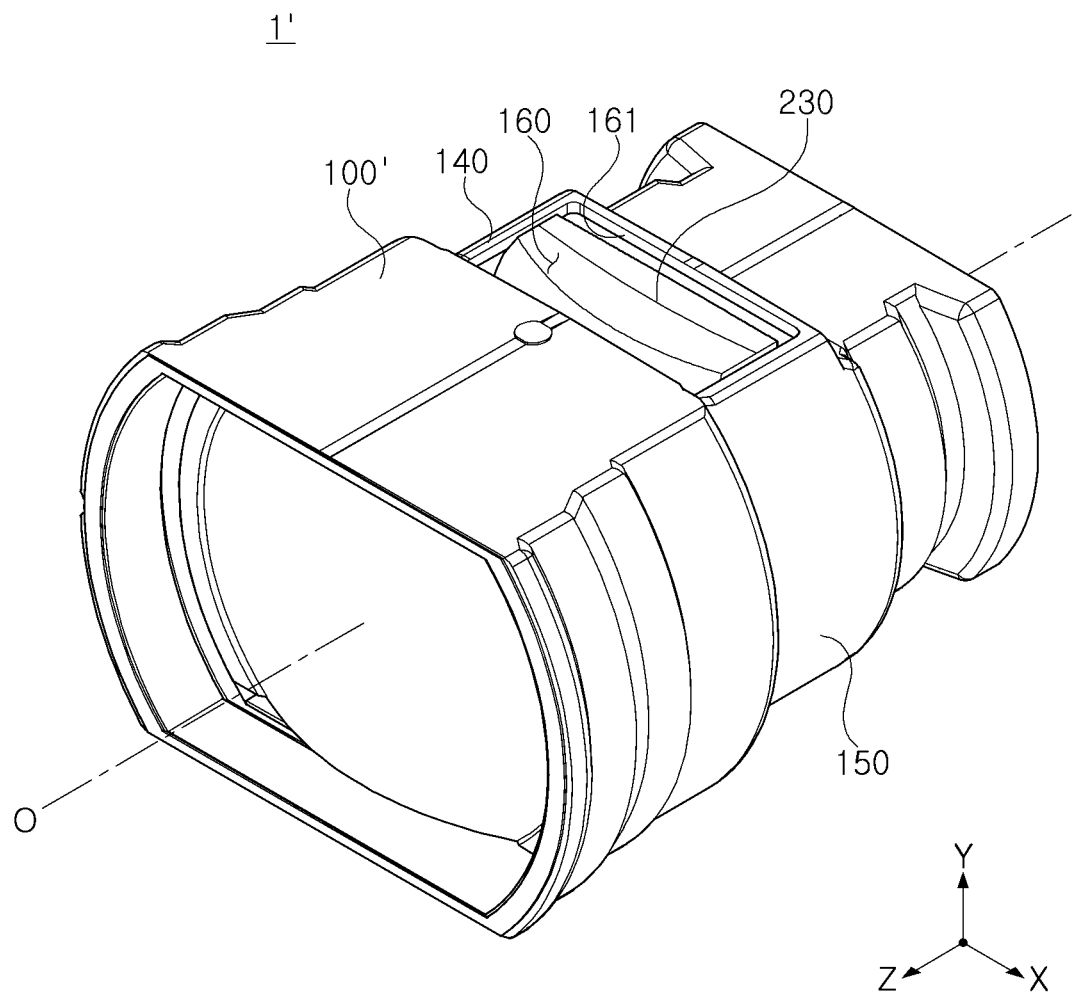
FIG. 5 is a perspective view of a lens assembly in which an opening is positioned at an inner portion of a lens barrel, according to an embodiment.

FIG. 5 is a perspective view of a lens assembly 1' in which the opening 160 is positioned at an inner portion of a lens barrel 100'.

Referring to FIG. 5, in an embodiment, the lens assembly 1' includes the lens barrel 100' and D-cut lenses 230 accommodated in the lens barrel 100'. The D-cut lenses 230 have a shape similar to that of the first and second D-cut lenses 210 and 220 shown in FIG. 2.

In an embodiment, linear portions of the D-cut lenses 230 may be exposed externally of the lens barrel 100'. When the lens barrel 100' is viewed in a direction perpendicular to the optical axis O (e.g., in the Y direction), a portion or the entirety of the linear portions of the D-cut lenses 230 may be visible externally of the lens barrel 100'.

In an embodiment, the lens barrel 100' is configured to expose the linear portions of the D-cut lenses 230 externally. For example, the lens barrel 100' may include an opening 160 corresponding to the linear portions of the D-cut lenses 230, and the linear portions may be exposed externally of the lens barrel 100' through the opening 160.

Referring to FIG. 5, the opening 160 may be provided in the form of a square hole positioned in the middle of the lens barrel 100'. For example, the opening 160 may be defined by an inner surface 161, which forms a closed loop.

A lens assembly (e.g., the lens assembly 1 of FIG. 1) according to an embodiment may include a first D-cut lens (e.g., the first D-cut lens 210 of FIG. 1); and a lens barrel (e.g., the lens barrel 100 of FIG. 1) partially surrounding a side surface of the first D-cut lens, wherein the side surface of the first D-cut lens includes a linear portion (e.g., the linear portion 211 of FIG. 3) and the lens barrel may be configured to expose at least a portion of the linear portion of the first D-cut lens in a direction perpendicular to an optical axis.

In an embodiment, the lens barrel may include an opening (e.g., the opening 130 of FIG. 1) corresponding to the linear portion, and the linear portion may be exposed through the opening.

In an embodiment, the linear portion may be configured to extend in a first direction perpendicular to the optical axis, and the linear portion may be configured to such that the linear portion is exposed in a second direction perpendicular to both the optical axis and the first direction.

In an embodiment, the first D-cut lens may extend to the inside of the opening.

In an embodiment, the linear portion may be positioned inside the opening.

In an embodiment, a height from the optical axis to the linear portion may be lower than a height from the optical axis to an external surface of the lens barrel.

In an embodiment, the linear portion may include a first linear portion and a second linear portion extending parallel to each other, the first linear portion and the second linear portion may be spaced apart from each other in a thickness direction of the lens barrel, and a distance between the first linear portion and the second linear portion may be less than a thickness of the lens barrel.

In an embodiment, when the lens barrel has a first length in a direction parallel to the optical axis, and the opening has a second length in a direction parallel to the optical axis, a ratio of the second length to the first length may be greater than or equal to 0.1 or and less than or equal to 0.5.

In an embodiment, when the first D-cut lens is viewed in a direction perpendicular to the optical axis, the linear portion may include a first section extending toward an image-side surface and a second section extending from an end of the first section toward the image-side surface. The first section may be exposed in a direction perpendicular to the optical axis through the opening, and the second section may be covered by the lens barrel.

In an embodiment, the first section may include a first inclined surface, the second section may include a second inclined surface, and the first inclined surface may converge on the optical axis to be steeper than the second inclined surface.

In an embodiment, the first inclined surface may have a first angle with respect to the optical axis, and the second inclined surface may have an angle smaller than the first angle.

In an embodiment, the opening may be opened in a direction parallel to the optical axis.

In an embodiment, the opening may have a hole shape positioned inside the lens barrel.

In an embodiment, the lens assembly may further include a second D-cut lens (e.g., the second D-cut lens 220 of FIG. 1) adjacent to the first D-cut lens, and the lens barrel may be configured to expose at least a portion of a linear portion of the second D-cut lens in a direction perpendicular to the optical axis.

In an embodiment, a ratio of a shorter axis length of the first D-cut lens to a longer axis length thereof may be 0.5 or more and 0.8 or less.

A lens assembly according to an embodiment disclosed herein may provide relatively high optical performance, while employing a D-cut lens. In addition, according to the disclosure herein, a thickness of a lens assembly including a D-cut lens may be minimized, while ease of manufacturing or optical performance of the D-cut lens is increased.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly, comprising:
a first D-cut lens; and
a lens barrel surrounding a portion of a side surface of the first D-cut lens,
wherein the side surface of the first D-cut lens includes an arc portion and a linear portion, and
wherein the lens barrel is configured to expose at least a portion of the linear portion and cover the arc portion of the first D-cut lens in a direction perpendicular to an optical axis.

2. The lens assembly of claim 1, wherein the lens barrel includes an opening corresponding to the linear portion, and the linear portion is exposed through the opening.

3. The lens assembly of claim 2, wherein the linear portion extends in a first direction perpendicular to the optical axis, and the opening is configured to expose the linear portion in a second direction perpendicular to the optical axis and the first direction.

4. The lens assembly of claim 2, wherein the first D-cut lens extends to an inside of the opening.

5. The lens assembly of claim 4, wherein the linear portion is positioned inside the opening.

6. The lens assembly of claim 2, wherein the lens barrel has a first length in a direction parallel to the optical axis, the opening has a second length in a direction parallel to the optical axis, and a ratio of the second length to the first length is greater than or equal to 0.1 and less than or equal to 0.5.

7. The lens assembly of claim 2, wherein, in a view of the D-cut lens in a direction perpendicular to the optical axis, the linear portion includes a first section extending toward an image-side surface and a second section extending from an end of the first section toward the image-side surface, the first section is exposed in a direction perpendicular to the optical axis through the opening, and the second section is covered by the lens barrel.

8. The lens assembly of claim 7, wherein the first section includes a first inclined surface, the second section includes a second inclined surface, and the first inclined surface converges toward the optical axis more steeply than the second inclined surface.

9. The lens assembly of claim 8, wherein the first inclined surface has a first angle with respect to the optical axis, and the second inclined surface has a second angle with respect to the optical axis that is smaller than the first angle.

10. The lens assembly of claim 2, wherein the opening is open in a direction parallel to the optical axis.

11. The lens assembly of claim 2, wherein the opening has a hole shape positioned at an inner portion of the lens barrel.

12. The lens assembly of claim 1, wherein a height from the optical axis to the linear portion is less than a height from the optical axis to an outer surface of the lens barrel.

13. A lens assembly, comprising:
a first D-cut lens; and
a lens barrel surrounding a portion of a side surface of the first D-cut lens,
wherein the side surface of the first D-cut lens includes a linear portion, and the lens barrel is configured to expose at least a portion of the linear portion of the first D-cut lens in a direction perpendicular to an optical axis,
wherein another portion of the linear portion is covered by the lens barrel in the direction perpendicular to the optical axis,
wherein the linear portion includes a first linear portion and a second linear portion extending parallel to each other, and
wherein the first linear portion and the second linear portion are spaced apart from each other in a thickness direction of the lens barrel, and a distance between the first linear portion and the second linear portion is less than a thickness of the lens barrel.

14. The lens assembly of claim 1, further comprising a second D-cut lens disposed adjacent to the first D-cut lens,
   wherein the second D-cut lens includes another linear portion formed in a side surface of the second D-cut lens, and
   wherein the lens barrel is configured to expose at least a portion of the other linear portion in the direction perpendicular to the optical axis.

15. The lens assembly of claim 1, wherein a ratio of a shorter axis length of the first D-cut lens to a longer axis length of the first D-cut lens is greater than or equal to 0.5 and less than or equal to 0.8.

16. The lens assembly of claim 1, wherein the lens barrel comprises a rim defining an opening in a side surface of the lens barrel, and the linear portion is positioned in a space surrounded by the rim.

17. The lens assembly of claim 16, wherein an entirety of the linear portion is positioned in a space surrounded by the rim.

18. A lens assembly, comprising:
   a lens including a side surface, the side surface having an arc portion and a linear portion extending transversely to the arc portion; and
   a lens barrel surrounding a portion of a side surface of the lens,
   wherein an opening is formed in a side wall of the lens barrel, and is configured to expose at least a portion of the linear portion in a direction perpendicular to an optical axis,
   wherein another portion of the linear portion is covered by the lens barrel in the direction perpendicular to the optical axis, and
   wherein the linear portion is disposed at a position between an inner surface of the side wall and an outer surface of the side wall.

19. The lens assembly of claim 18, wherein the opening is formed in an end portion of the lens barrel.

20. The lens assembly of claim 1,
   wherein the linear portion includes a first linear portion and a second linear portion extending parallel to each other, and
   wherein the first linear portion and the second linear portion are spaced apart from each other in a thickness direction of the lens barrel, and a distance between the first linear portion and the second linear portion is less than a thickness of the lens barrel.

* * * * *